(12) United States Patent
Watanabe et al.

(10) Patent No.: US 7,072,657 B2
(45) Date of Patent: Jul. 4, 2006

(54) METHOD AND ASSOCIATED APPARATUS FOR PRE-AUTHENTICATION, PREESTABLISHED VIRTUAL PRIVATE NETWORK IN HETEROGENEOUS ACCESS NETWORKS

(75) Inventors: Fujio Watanabe, San Jose, CA (US); Shahid Shoaib, San Jose, CA (US); Jingjun Cao, Mountain View, CA (US); Shoji Kurakake, San Francisco, CA (US)

(73) Assignee: NTT DoCoMo, Inc., Tokyo (JP)

( * ) Notice: Subject to any disclaimer, the term of this patent is extended or adjusted under 35 U.S.C. 154(b) by 459 days.

(21) Appl. No.: 10/121,121

(22) Filed: Apr. 11, 2002

(65) Prior Publication Data

US 2004/0192309 A1    Sep. 30, 2004

(51) Int. Cl.
*H04Q 7/20* (2006.01)
*H04Q 7/00* (2006.01)
*G06F 15/16* (2006.01)

(52) U.S. Cl. ............... 455/439; 455/437; 709/245; 709/227; 370/328

(58) Field of Classification Search .......... 455/436, 455/445, 439, 442, 422.1, 33.2, 426, 437; 370/389, 264, 328, 338, 401, 219; 709/228, 709/245, 227; 713/201; 379/219
See application file for complete search history.

(56) References Cited

U.S. PATENT DOCUMENTS

| | | | |
|---|---|---|---|
| 5,784,450 A * | 7/1998 | Stahl ............... | 379/221.09 |
| 6,205,216 B1 * | 3/2001 | Slater et al. ............ | 379/229 |
| 6,304,973 B1 * | 10/2001 | Williams ................ | 713/201 |
| 6,385,451 B1 * | 5/2002 | Kalliokulju et al. ...... | 455/437 |
| 6,484,211 B1 * | 11/2002 | Turunen ................ | 709/245 |
| 6,522,880 B1 * | 2/2003 | Verma et al. ............ | 455/436 |
| 6,563,800 B1 * | 5/2003 | Salo et al. .............. | 370/264 |
| 6,631,416 B1 * | 10/2003 | Bendinelli et al. ....... | 709/227 |
| 6,647,109 B1 * | 11/2003 | Henderson ............. | 379/219 |
| 6,675,225 B1 * | 1/2004 | Genty et al. ............ | 709/245 |
| 6,708,031 B1 * | 3/2004 | Purnadi et al. .......... | 455/436 |
| 6,904,025 B1 * | 6/2005 | Madour et al. .......... | 370/328 |
| 2002/0002687 A1 * | 1/2002 | Chantrain et al. ........ | 713/201 |
| 2002/0018456 A1 * | 2/2002 | Kakemizu et al. ....... | 370/338 |
| 2002/0029276 A1 * | 3/2002 | Bendinelli et al. ....... | 709/227 |
| 2002/0045450 A1 * | 4/2002 | Shimizu et al. .......... | 455/442 |

(Continued)

OTHER PUBLICATIONS

Gang Wu et al., "Wireless Internet over Heterogeneous Wireless Networks," IEEE GLOBECOM'01, IPS03-4, Austin, Nov. 2001, seven pages.

(Continued)

*Primary Examiner*—Jean Gelin
*Assistant Examiner*—Kiet Doan
(74) *Attorney, Agent, or Firm*—Edward C. Kwok; MacPherson Kwok Chen & Heid LLP

(57) ABSTRACT

A method of coordinating the handoff of a mobile carrier between a first access network and a second access network. The method including establishing a contract between a user of a mobile carrier and a hyper operator and attempting a hand off from a first access network that the mobile carrier is currently operating within to a second access network, wherein the attempting includes authenticating at the hyper operator only that the user may have access to the second access network via the contract. Handing off to the second access network if the authenticating is successful.

16 Claims, 10 Drawing Sheets

U.S. PATENT DOCUMENTS

| | | | | |
|---|---|---|---|---|
| 2002/0099862 A1* | 7/2002 | Mikalsen et al. | | 709/310 |
| 2002/0103931 A1* | 8/2002 | Mott | | 709/245 |
| 2002/0124090 A1* | 9/2002 | Poier et al. | | 709/228 |
| 2002/0136226 A1* | 9/2002 | Christoffel et al. | | 370/401 |
| 2002/0142774 A1* | 10/2002 | Saint-Hilaire et al. | | 455/445 |
| 2003/0014541 A1* | 1/2003 | Poeluev | | 709/245 |
| 2003/0079121 A1* | 4/2003 | Gilman et al. | | 713/153 |
| 2003/0083062 A1* | 5/2003 | Bartolome et al. | | 455/426 |
| 2003/0087642 A1* | 5/2003 | Mazzara | | 455/450 |
| 2003/0092444 A1* | 5/2003 | Sengodan et al. | | 455/436 |
| 2003/0108041 A1* | 6/2003 | Aysan et al. | | 370/389 |
| 2003/0112755 A1* | 6/2003 | McDysan | | 370/230 |
| 2003/0157942 A1* | 8/2003 | Osmo | | 455/456 |
| 2004/0029587 A1* | 2/2004 | Hulkkonen et al. | | 455/436 |

OTHER PUBLICATIONS

R. Walsh et al., "Hybrid Networks—A Step Beyond 3G," Third International Symposium on Wireless Personal Multimedia Communications (WPMC'00) Bangkok, Nov. 2000, pp. 109-114.

M. Stemm et al., "Vertical Handoffs in Wireless Overlay Networks," Mobile Networks and Applications, vol. 3, No. 3, 1998, pp. 335-350.

P. Pangalos et al., "End-to-End SIP Based Real Time Application Adaptation During Unplanned Vertical Handovers," IEEE GLOBECOM'01, WCS 13-5, Austin, Nov. 2001, six pages.

S. Kent et al., "Security Architecture for the Internet Protocol," IETF RFC, Nov. 1998, available at http://www.ietf.org/rfc/rfc2401.txt, pp. 1-66.

C. Rigney et al., "Remote Authentication Dial In User Service (RADIUS)," IETF RFC 2138, Apr. 1997, available at http://www.ietf.org/rfc/rfc2138.txt, pp. 1-65.

B. Aboba et al., "The Network Access Identifier," IETF RFC 2486, Jan. 1999, available at http://www.ietf.org/rfc/rfc2486.txt, pp. 1-8.

E. Rosen et al., "Multiprotocol Label Switching Architecture," IETF RFC 3031, Jan. 2001, pp. 1-61.

J. Lau et al., "Layer Two Tunneling Protocol (Version 3) L2TPv3," Nov., 2002, available at draft-ietf-l2tpext-l2tp-base-04.txt, pp. 1-80.

H. Soliman et al., "Hierarchical Mobile IPv6 Mobility Management (HMIPv6)," Oct. 2002, available at draft-ietf-mobileip-hmipv6-07.txt, pp. 1-29.

Fujio Watanabe et al., "Physical Access Network Topology Map in Hyper Operator Overlay Architecture," IEEE, 2002, five pages.

Gang Wu et al., "MIRAI Architecture for Heterogeneous Network," IEEE Communications Magazine, Feb. 2002, pp. 126-134.

Lixia Zhang et al., "RSVP: A New Resource ReSerVation Protocol—Novel Design Features Lead to an Internet Protocol that is Flexible and Scalable," IEEE Network, Sep. 1993, pp. 8-18.

* cited by examiner

METHOD AND ASSOCIATED APPARATUS FOR PRE-AUTHENTICATION, PREESTABLISHED VIRTUAL PRIVATE NETWORK IN HETEROGENEOUS ACCESS NETWORKS

BACKGROUND OF THE INVENTION

1. Field of the Invention

The present invention relates to the field of wireless networks.

2. Discussion of Related Art At present, there is no single wireless network technology that can provide best services, such as low latency, broadband service and maintaining QoS performance. Overlay access networks that provide various services can be used to overcome this problem. Examples of such overlay access networks are described in the following references: 1) G. Wu, P. J. M. Havinga, and M. Mizuno, "Wireless Internet over heterogeneous wireless networks," IEEE GLOBECOM'01, IPS03–4, Austin, November 2001 and "MIRAI architecture for heterogeneous network," IEEE Commun. Mag. vol. 40, no. 2, pp. 126–134, February 2002., 2) M. Stemm and R. H. Katz, "Vertical handoffs in wireless overlay networks," Mobile Networks and Applications, vol. 3, no. 3, pp. 335–350, 1998 and 3) P. Pangalos et al., "End-to-end SIP based real time application adaptation during unplanned vertical handovers," IEEE GLOBECOM'01, WCS13–5, Austin, November 2001.

In the above-identified wireless overlay access networks, a hierarchical coverage area structure from small to large is considered as a heterogeneous access network. A heterogeneous access network includes different radio access networks (RANs). Three well-known models of organizing heterogeneous access networks that include two RANS, designated as network X and network Y, are illustrated in FIGS. 1A–C. In the model, also known as a tunneled network, shown in FIG. 1A, two independent RANs, X and Y, are connected to the internet 100 and a mobile host or terminal 310, such as a cell phone, a lap top computer or a PDA. Each of the RANs includes a L2/L1 layer, 102, 102', a network layer, 104, 104', and a transport layer 106, 106'. In such a model, a user has a service agreement with several RANs operators independently, such as RANs X and Y. The optimal network, X or Y, for a requested service cannot be selected automatically by the mobile host, so the access network selected by the user has to be used for the requested service. If the mobile host handoffs from one access network to another access network, the mobility or handoff between network X and network Y will be handled at relatively high network layers or the connection is either terminated or re-established.

A second example of a heterogeneous access network model is schematically shown in FIG. 1B. In this "hybrid network" model, a single hybrid core 108 interfaces directly between the RANs X and Y and the Internet so as to facilitate the handoff between RAN X and RAN Y.

The RANs X and Y implement their respective network layers 104, 104' and lower layers L2/L1 102, 102'. An example of such a "hybrid network" model is described in the reference R. Walsh, L. Xu, and T. Paila, "Hybrid networks—a step beyond 3G," Third international symposium on wireless personal multimedia communications (WPMC'00), pp.109–114, Bangkok, November 2000.

One advantage of the "hybrid network" model is the reduction of function duplication between the two RANs X and Y. Another advantage of the "hybrid network" model is that it does not require that a single network be designed so as to optimize all existing and future services. Instead, it is possible to use a combination of several bearer networks, each of which is optimized for some particular services. Note that the selection of the most suitable bearer network is based on several things including available bandwidth, service classification (e.g. streaming video or Internet browsing) and network operator contract policies. Basically, each service is delivered via the network that is most efficient to support the service. For instance, mobile phone is used for voice communication and a wireless LAN is used for data communication. One drawback of such a "hybrid network" is that a coordination function mechanism is necessary to combine several bearer networks.

A third example of a known heterogeneous access network model is schematically shown in FIG. 1C. In this "heterogeneous network" model, a single common core 110 interfaces directly between the lower layers 102, 102' of the RANs X and Y and the Internet. The common core 110 includes a handoff mechanism (mobility management) and radio resource management that bring all core network functionality together and operates as a single network. The lower layers 102, 102' of the RANs X, Y handle only specific radio access technology and so, in general, the wireless access radio incorporates the PHY and DLC (layer 2). An example of such a "heterogeneous network" model is described in the reference G. Wu, P. J. M. Havinga, and M. Mizuno, "Wireless Internet over heterogeneous wireless networks," IEEE GLOBECOM'01, IPS03–4, Austin, November 2001 and "MIAAI architecture for heterogeneous network," IEEE Commun. Mag. vol. 40, no 2, pp 126–134, February 2002.

Another known network architecture is the so-called Virtual Private Network (VPN). VPNs have gained great popularity over the last few years in the business environment because they provide a very cost effective solution to securely accessing corporate intranets over the public Internet. See S. Kent and R. Atkinson, "Security architecture for the Internet protocol," IETF RFC htt://vww.ietf.org/rfc/rfc2401.txt. In the future it will be very important to provide VPN functionality to businesses in a heterogeneous mobile environment. The issue is not just how to support the VPN functionality in a heterogeneous environment but also how to support seamless mobility of applications and services using the VPNs. If it is desired to use VPN in the heterogeneous access networks, FIG. 2 schematically shows a way to establish VPN. In particular, the VPN 208 of FIG. 2 is established between the company intranet 210 and current access network 206. Another VPN is established between the company intranet 210 and a target access network 212. As shown in FIG. 2, a VPN network architecture 200 includes a mobile terminal, such as a cell phone or a lap top computer 310 which is currently in communication with an access network 204. The access network 204 is in communication, via gateway 206, with a VPN 208 that is in communication with a company intranet 210. The company intranet 210 includes contents service providers and will not restrict any entity that desires to establish a VPN. Similarly, a second access network 212 is in communication, via gateway 208, with a VPN 214 that is also in communication with the company intranet 210.

The mobile terminal alters communication from the current access network 204 to the target access network 212 by renegotiating and reestablishing the VPN 214 between the company intranet 210 and the target access network 212. VPN 214 re-establishment is shown in FIG. 2. VPN 214 is re-established when the mobile terminal moves to the target access network 212. In addition, the user needs to have VPN service agreements with different access networks in order to use the VPN.

One prior attempt to overcome the deficiencies of the VPN network architecture 200 is shown in FIG. 3. In this system, a hyper operator overlay (HOO) network architecture 300 is employed that combines different access networks to provide most suitable access network to each available service. As shown in FIG. 3, the HOO network 300 includes different access networks 302A–D, service providers 304A–B and a hyper operator 406. The hyper operator 406 works to coordinate different access networks and service providers 304A–B (such as, yahoo.com) including private intranets (e.g. company intranet 210) in order to have seamless communications.

The mobile device, such as a cell phone, PDA or a lap top computer 310, supports different access network technologies such as WLAN, mobile phone, Bluetooth, ADSL, etc. Currently, the software defined radio is a component within the mobile device 310 that applies software to adapt the mobile device 310 to support different radio access technologies with one network interface card (NIC). Instead of having several service agreements with different access networks 302 and service providers 304, a user using the mobile device will only need to have a single service agreement with the hyper operator 406. Because of a service contract with the hyper operator 406, the user can gain access to different access networks 302 by the mobile device without establishing new service contracts.

The HOO network 300 does not require modifications to existing access networks. HOO can work as a broker or a bridge between different access networks and service providers, and can coordinate service offered by different access networks and service providers. However, access networks 302 and service providers 304 will often duplicate the same functions, such as authentication. Accordingly, all data transactions involve multiple round trips across the Internet, that results in an increase in the network load and service latency. One proposed solution to this problem is for the basic access network (BAN) to provide a common control/signaling channel for all mobile terminal access. See G. Wu, P. J. M. Havinga, and M. Mizuno, "Wireless Internet over heterogeneous wireless networks," IEEE GLOBECOM'01, IPS03–4, Austin, November 2001 and "MIRAI architecture for heterogeneous network," IEEE Commun. Mag. vol. 40, no 2, pp 126–134, February 2002. Unfortunately, the BAN only supports the access system and probably the handoff signaling may be supported but the connection over the network is out of their scope. In addition, BAN requires current access network modification so that the current access operator may not join this architecture without an infrastructure investment.

Another disadvantage of the HOO network 300 presents itself when contemplating the connection in the vertical handoff, which is the handoff between different access networks. In this connection, the authentication and VPN (virtual private network) 314 established in the internet 320 is renegotiated with the gateway 316 of the target access network, then the authentication request will be sent to the same company intranet 210. This duplication of authentication happens whenever the mobile terminal moves to a different one of the access networks 302A–D. Although the user is already authenticated at the previous VPN establishment, a new VPN will require another authentication again to establish VPN. Note that one or more of the access networks 302A–D are in communication with a mobile terminal 310 and the like and several scheme such as L2TP and L2F (both layer 2 level VPN), IPsec (layer 3 level VPN) can help to establish VPN 314 mentioned above.

SUMMARY OF THE INVENTION

One aspect of the present invention regards a method of coordinating the handoff of a mobile carrier between a first access network and a second access network. The method including establishing a contract between a user of a mobile carrier and a hyper operator and attempting a hand off from a first access network that the mobile carrier is currently operating within to a second access network, wherein the attempting includes authenticating at the hyper operator only that the user may have access to the second access network via the contract. Handing off to the second access network if the authenticating is successful.

A second aspect of the present invention regards a handoff system for coordinating the handoff of a mobile carrier between a first access network and a second access network. The handoff system includes a first access network in communication with a mobile carrier of a user, a second access network; and a hyper operator in communication with the first access network, wherein the hyper operator hands off communication between said mobile carrier and said first access network so that said mobile carrier is in communication with the second access network, and wherein the hyper operator authenticates only that the user may have access to the second access network based on a contract between the user and the hyper operator.

Each of the above aspects of the present invention provides the advantage of reducing authentication and VPN tunnel establishment time when the user moves between different access networks.

Each of the above aspects of the present invention provides the advantage of reducing VPN re-establishment time when a mobile terminal moves to different access networks.

The present invention, together with attendant objects and advantages, will be best understood with reference to the detailed description below in connection with the attached drawings.

DETAILED DESCRIPTION OF THE INVENTION

Figure 3:
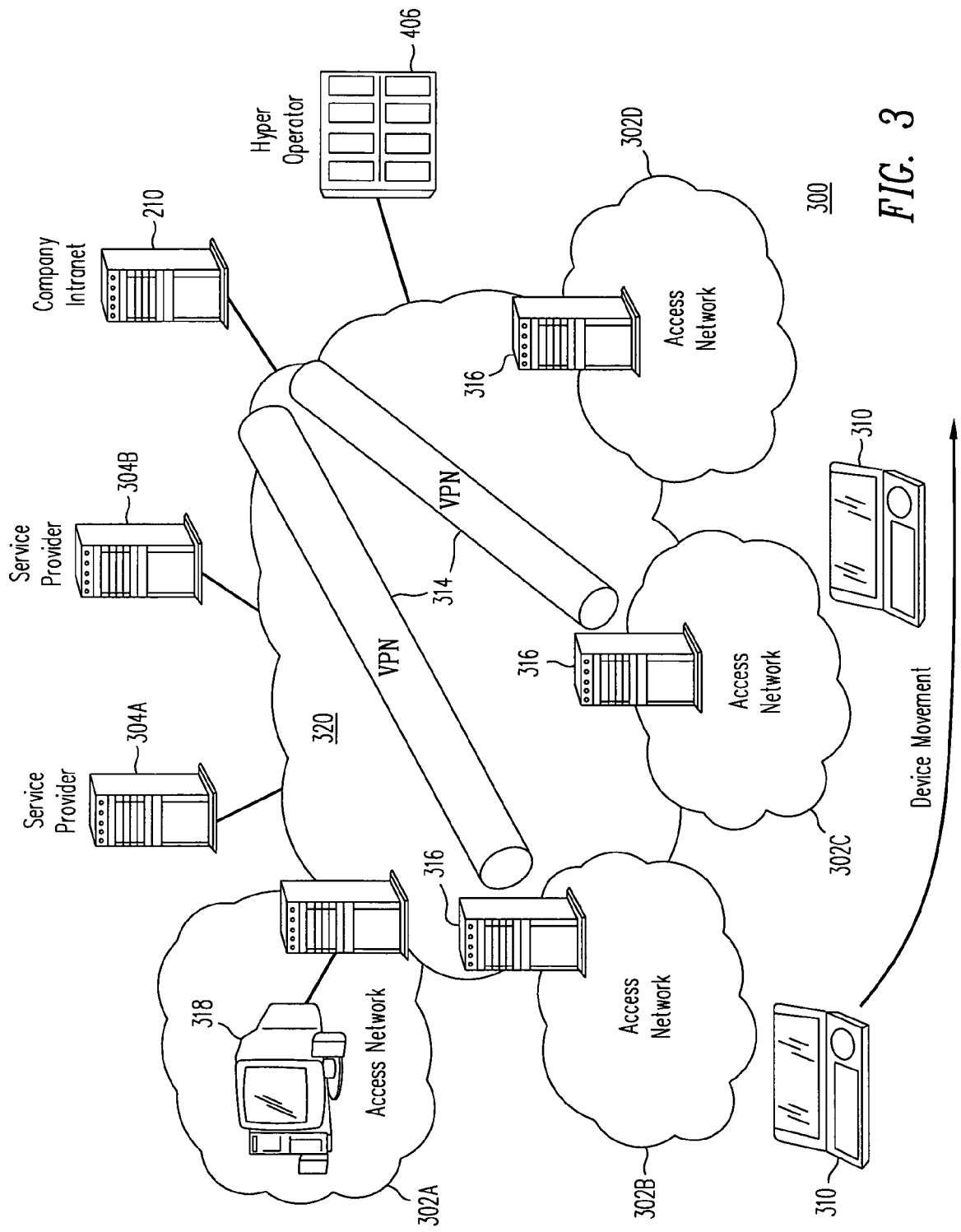
FIG. 3 schematically shows a second embodiment of a known network architecture.
Figure 4:
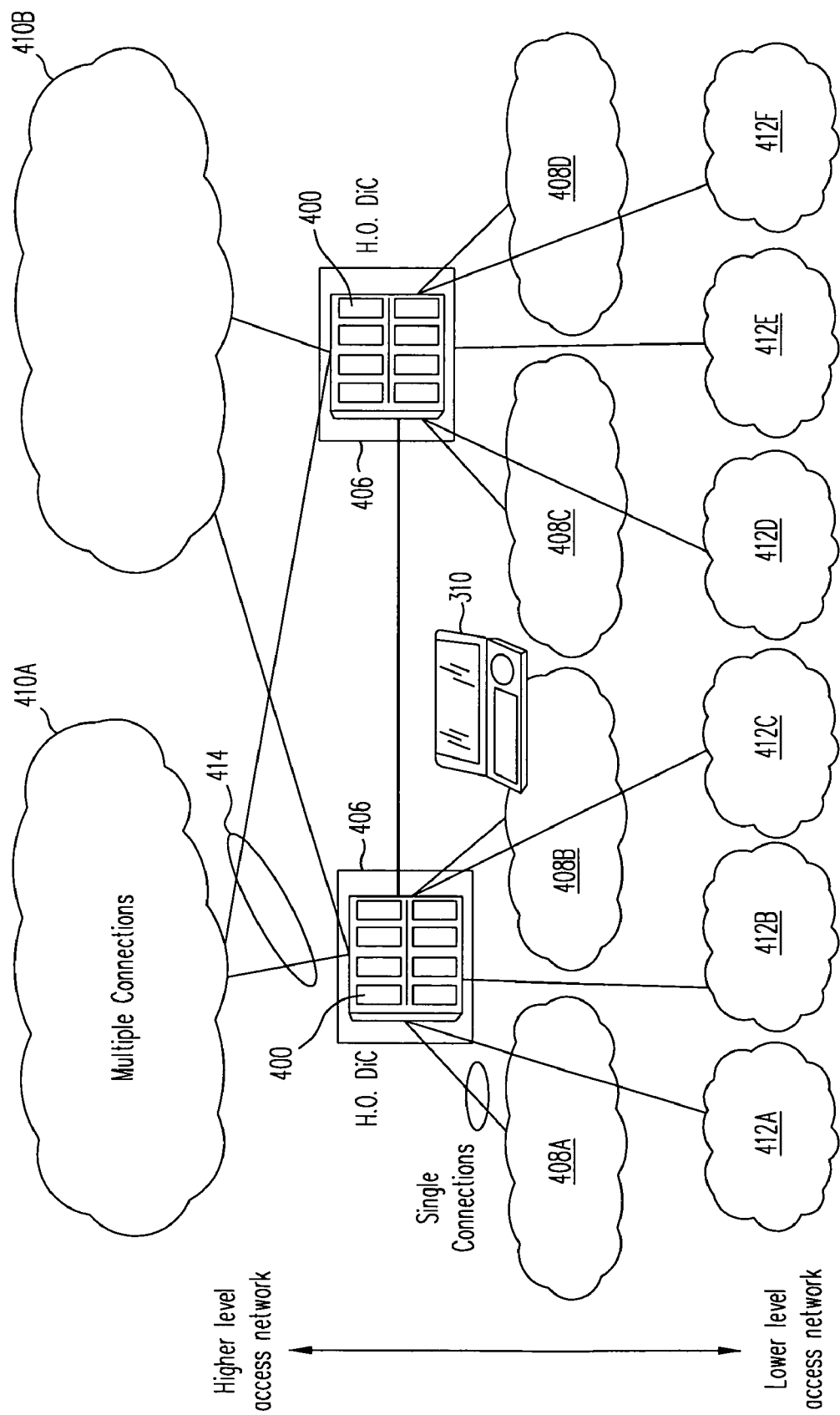
FIG. 4 schematically shows a first embodiment of a network architecture according to the present invention.

In order to overcome the problems of the architecture 300 of FIG. 3, the hyper operator 406 of FIG. 3 is altered so as to include a hyper operator distributed center 400 (H.O.DiC) as shown in FIG. 4. The hyper operator distributed center 400 enables the hyper operator 406 to empower the user to gain use of access networks 408A–D, 410A–B, 412A–F which the user does not have any service agreement. This is possible because the user requires only a service agreement with the hyper operator 406. Also, it is possible that the user can have any service agreement individually with access networks 408A–D, 410A–B, 412A–F. In terms of scalability, the hyper operator 406 may not be able to afford many requests from different places so that the H.O.DiC 400 can be distributed over the network. H.O.DiC 400 can connect the hyper operator 406 through the dedicated channel or even VPN which is permanently established. Note that in the embodiment shown in FIG. 4, access networks 408A–D represent current access networks of such a level that only a connection with a single H.O.DiC 400 exists. Target access networks 410A–B and 412A–F are higher level and lower level networks, respectively, where networks 410A–B include connections with multiple H.O.DiCs 400 while networks 412A–F have only a connection with a single H.O.DiC 400.

Whenever the user accesses an access network 408A–D, 410A–B, 412A–F, a user authentication or a device authentication are necessary. The password authentication protocol (PAP) and the challenge handshake authentication protocol (CHAP) are used for the user authentication and the device authentication, respectively. An example of the CHAP protocol is described in the reference C. Rigney, A. Rubens, W. Simpson, S. Willens, "Remote authentication dial in user service (RADIUS)," IETF RFC 2138, http://www.ietf.org/rfc/rfc2138.txt. Since the user or device authentication data is located in the hyper operator 406 that is not located nearby, the time to obtain authentication information requires some time. Particularly, when the mobile terminal, such as a cell phone, PDA or a lap top computer 310, moves from a current access network 408B to the target access network 410A–B, 412A–F, the target access network 410A–B, 412A–F has to access the hyper operator 406 again to get authentication information.

To avoid a long authentication time, the H.O.DiC 400 stores user information temporarily for authentication purpose, which can be obtained from the hyper operator 406. Since there is a trust relation between the hyper operator 406 and the H.O.DiC 400 via a service agreement or contract, it is reliable to give some user's authentication information. However, the user's authentication information obtained from the hyper operator 406 has the term of validity. The H.O.DiC 400 connects to some access networks shown in FIG. 4. When the size of service coverage is taken into consideration, the access system, which has a wider coverage area, will have multiple connections 414 with different H.O.DiCs 400, so that the authentication can be made quickly. Since the access networks 410A–B having a wider coverage area is usually higher-level access network, it is a reasonable assumption that at least higher-level access network should cover the user anytime for seamless communication. Therefore, the higher-level access networks 410A–B can have multiple connections with a different H.O.DiC 400. On the other hand, the lower-level access networks 412A–F, which basically have a small coverage area, connect only to the single H.O.DiC 400. This is because the first authentication is guaranteed by the higher-level access networks 410A–B having the multiple connections. Therefore, the lower-level access networks 412A–F can have a single connection to the H.O.DiC 400. The H.O.DiC 400 has connections to several lower level access networks 412A–F. The user authentication will be handled at the H.O.DiC 400.

Note that the reason for multiple connections or a single connection is to keep a seamless connection. Since the upward vertical handoff is a time critical (See M. Stemm and R. H. Katz, "Vertical handoffs in wireless overlay networks," Mobile Networks and Applications, vol. 3, no. 3, pp. 335–350, 1998), authentication time can be reduced and even pre-authentication can be arranged if the large coverage area networks 410A–B are located in the same H.O.DiC 400. The phrase "upward vertical handoff" means that the mobile terminals moves from lower level access networks 412A–F (smaller coverage area) to the higher level access networks 410A–B (larger coverage area).

Figure 1C:
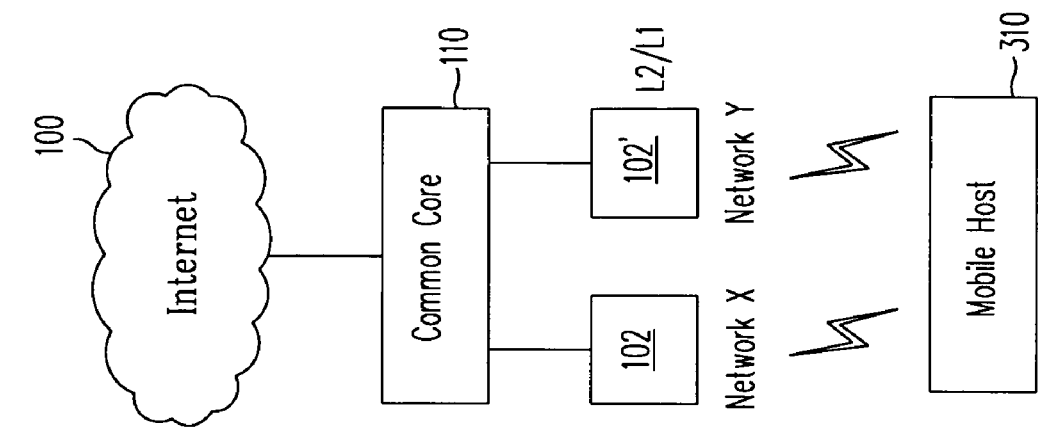
FIG. 1C schematically shows an embodiment of a known heterogeneous network.
Figure 1B:
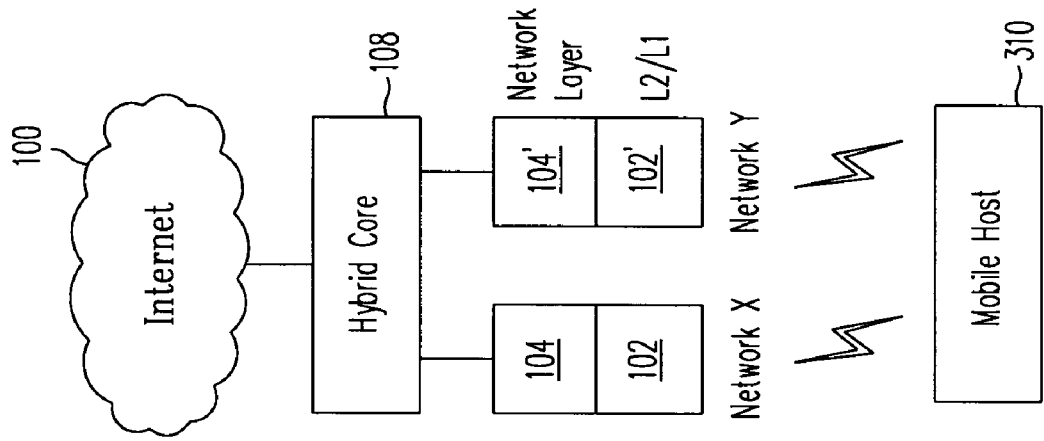
FIG. 1B schematically shows an embodiment of a known hybrid network.
Figure 1A:
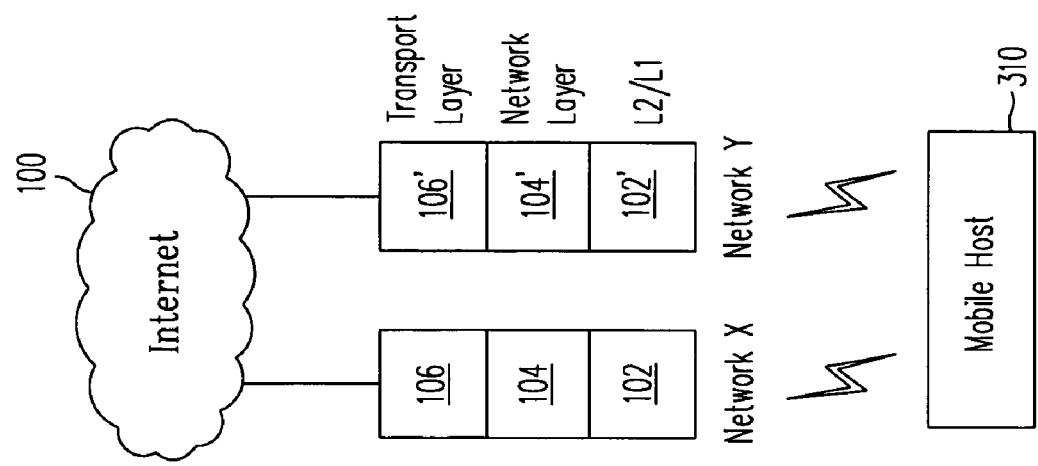
FIG. 1A schematically illustrates a known embodiment of tunneled network.
Figure 2:
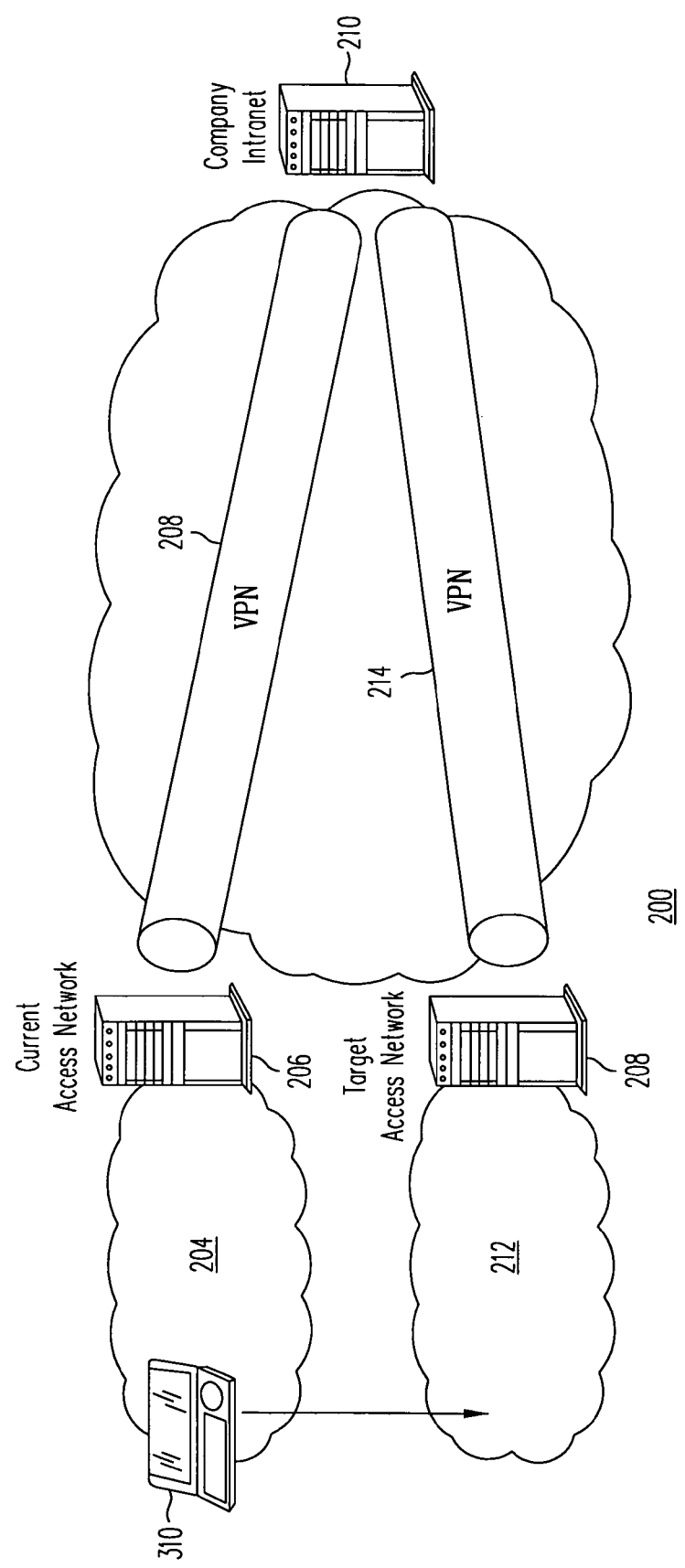
FIG. 2 schematically shows an embodiment of a network architecture that employs VPN architecture.
Figure 5:
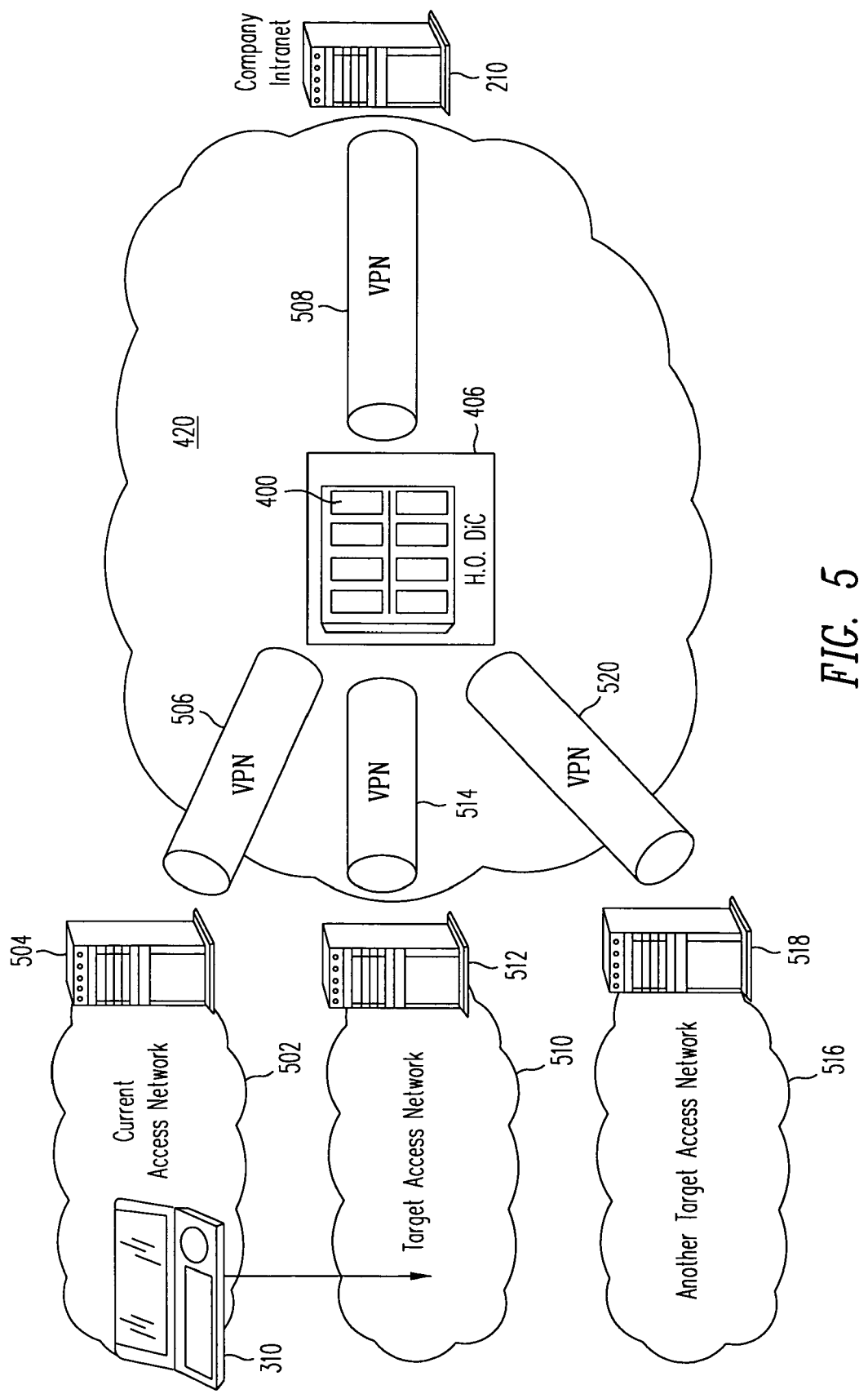
FIG. 5 schematically shows a second embodiment of a network architecture according to the present invention.

Instead of having a VPN extend between access networks and the company intranet in the manner shown in FIGS. 2 and 3, the H.O.DiC 400 works as a proxy as shown in FIG. 5. In particular, when the mobile terminal, such as a cell phone, PDA or the lap top computer 310, is accessing the current access network 502, via gateway 504, the VPN 506 is established between the current access network 502 via gateway 504 and the H.O.DiC 400. Furthermore, another VPN 508 is established between the company intranet 210 and H.O.DiC 400. From the user point of view, the VPN is established between the company intranet 210 and the current access network 502, but practically the VPN is segmented by the H.O.DiC 400. Consequently, the lap top computer 310 handoffs from the current access network 502 to the target access network 510 via gateway 512, the VPN 514 is only re-established between the target access network 510 via gateway 512 and the H.O.DiC 400. Also, when the lap top computer 310 handovers to another target access network 516 via gateway 518, the VPN 520 is only re-established between the H.O.DiC 400 and the target access network 516. Consequently, the VPN establishment time can be saved because the VPN 508 established between the H.O.DiC 400 and the company intranet 210 is present irrespective which of the VPNs 506, 514, 520 is established.

The scheme shown in FIG. 5 has another advantage in terms of VPN service contracts. To use a VPN in the past, the user needs to have a separate VPN service contract with different access networks. However, the user can only make the VPN service contract with the hyper operator 406. In direct contrast, the user of the scheme of FIG. 5 does not need separate VPN service agreements with different access networks as long as the user has a contract with the hyper operator 406.

Figure 6:
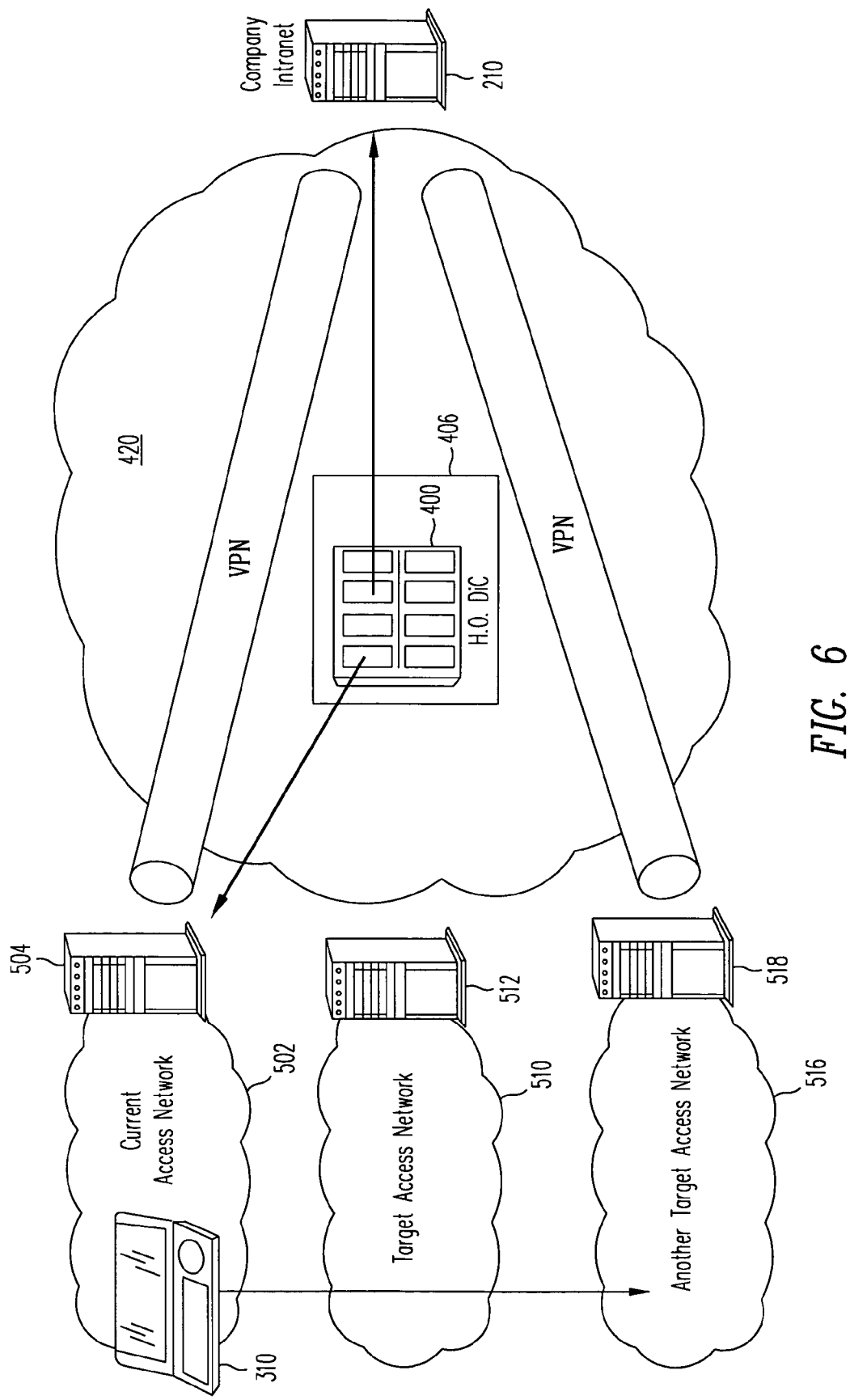
FIG. 6 schematically shows a third embodiment of a network architecture according to the present invention.

An alternative scheme is shown in FIG. 6 where the H.O.DiC 400 assists the establishment of a VPN between the access network 502 and the company Intranet 210. In order to realize this VPN establishment, the H.O.DiC 400 provides the authentication information such as the shared key to both current access network 502 and the company intranet 210 after the user, via the lap top computer 310, is authenticated by the H.O.DiC 400 or the hyper operator 406. This shared key is a one-time password to establish a VPN between them. For instance, suppose the user indicates via the lap top computer 310 that he or she wishes to have a VPN connection between the current access network 502 and the company intranet 210. Furthermore, suppose there is no VPN service agreement between the user and the current access network 502. In this scenario, the current access network 502 contacts the H.O.DiC 400 to get the shared key for authentication as well as billing confirmation. For the company intranet 210, the H.O.DiC 400 provides the same shared key that network 502 receives from H.O.DiC 400 to the company intranet 210 for VPN establishment. So, the current access network 502 and the company intranet 210 can authenticate each other via the shared key. However, the shared key is valid only for this particular VPN establishment. If another user wishes to establish a VPN, the H.O.DiC 400 can provide another shared key to both the current access network 502 and the company intranet 210 in the manner described above.

Figure 7:
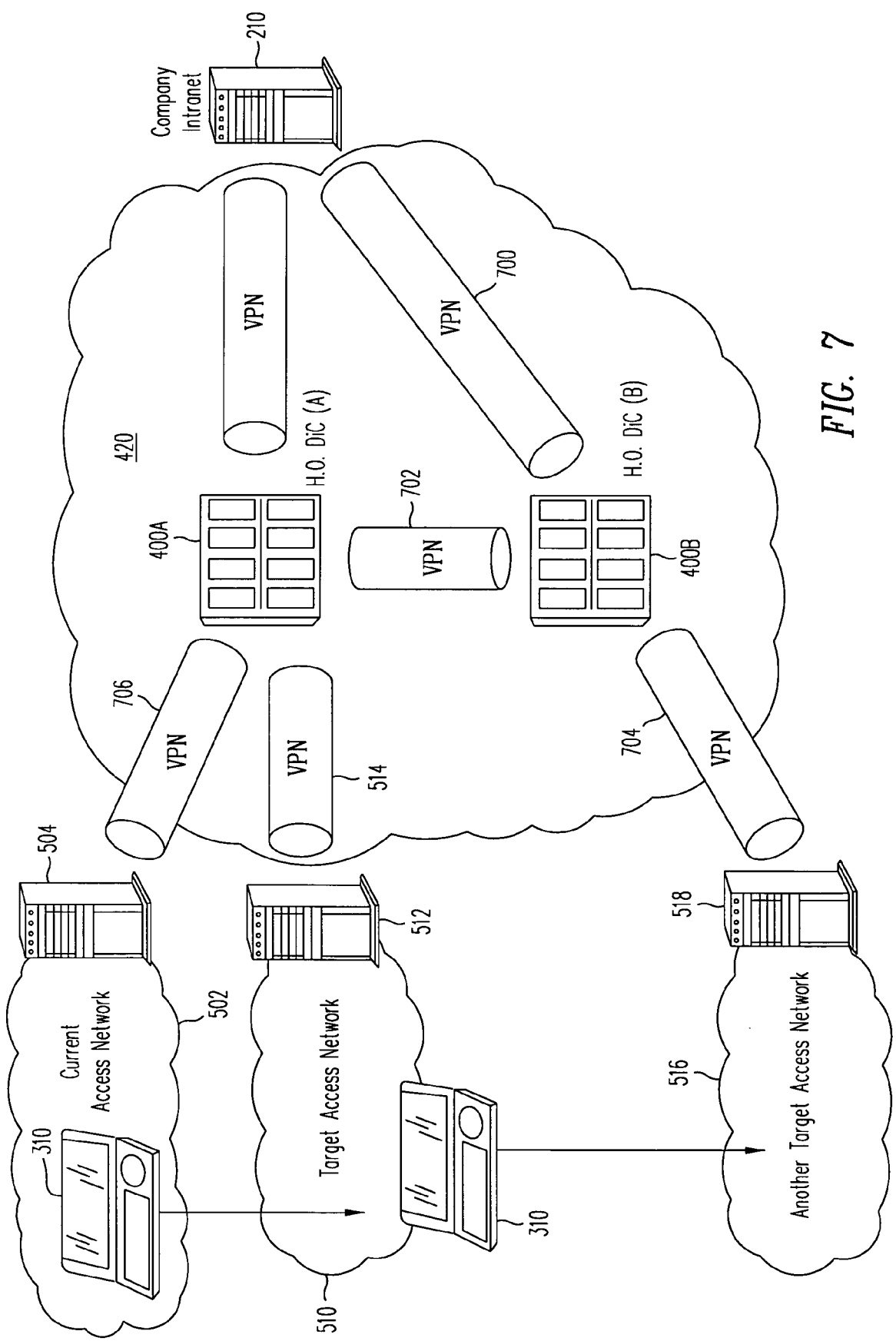
FIG. 7 schematically shows a fourth embodiment of a network architecture according to the present invention.

As shown in FIG. 7, pre-authentication and pre-VPN establishment is possible via the H.O.DiC 400. In this scheme, suppose the lap top computer 310 is about to leave the coverage area of the current access network 502, then a handoff arrangement is necessary to have a seamless communication. Pre-authentication and pre-VPN establishment will help a fast handoff. Therefore, the H.O.DiC arranges the pre-VPN establishment between the access networks 510, 516 that are possibly involved in the handoff and the H.O.DiC 400. For instance, the VPN 514 is pre-established between the target access network 510 and the H.O.DiC 400A. Since the H.O.DiC 400A has user's information, it is possible to have pre-arrangement and not to disclose the user's information to the target access network 510. Note that access network 502 does not undergo pre-authentication because it is the current access network. Note that as used above and throughout this description, a pre-VPN has the same structure as a VPN. The only difference is that a pre-VPN is for future and has no actual traffic since it is prepared for future traffice between various networks. Once the pre-VPN conveys actual traffic it is deemed a VPN (which is currently used).

As with the scheme shown in FIG. 4, the access networks 502, 510 and 516 are not always connected to just one H.O.DiC. For example, the target access network 516 connects via gateway 518 and VPN 704 to another H.O.DiC 400B, as shown in FIG. 7. This means that the authentication required to connect to the target access network 516 is handled at H.O.DiC 400B. If the lap top computer 310 is going to handoff to the target access network 516 via gateway 518 from the current access network 502 via gateway 504 and VPN 706, the H.O.DiC 400A first contacts the H.O.DiC 400B to arrange the pre-VPN 704 between the gateway 518 and the H.O.DiC 400B. In addition, the H.O.DiC 400B arranges a pre-VPN 700 between the H.O.DiC 400B and the company intranet 210. Consequently, the shortest VPN path can be made from the gateway 518 to the company intranet 210. The permanent or dynamic VPN 702 between the H.O.DiC 400A and the H.O.DiC 400B can be made easily depending on the traffic. This is because the information for the VPN 702 information is not related to the user, but is instead is related to the H.O.DiC 400A and the H.O.DiC 400B.

Figure 8:
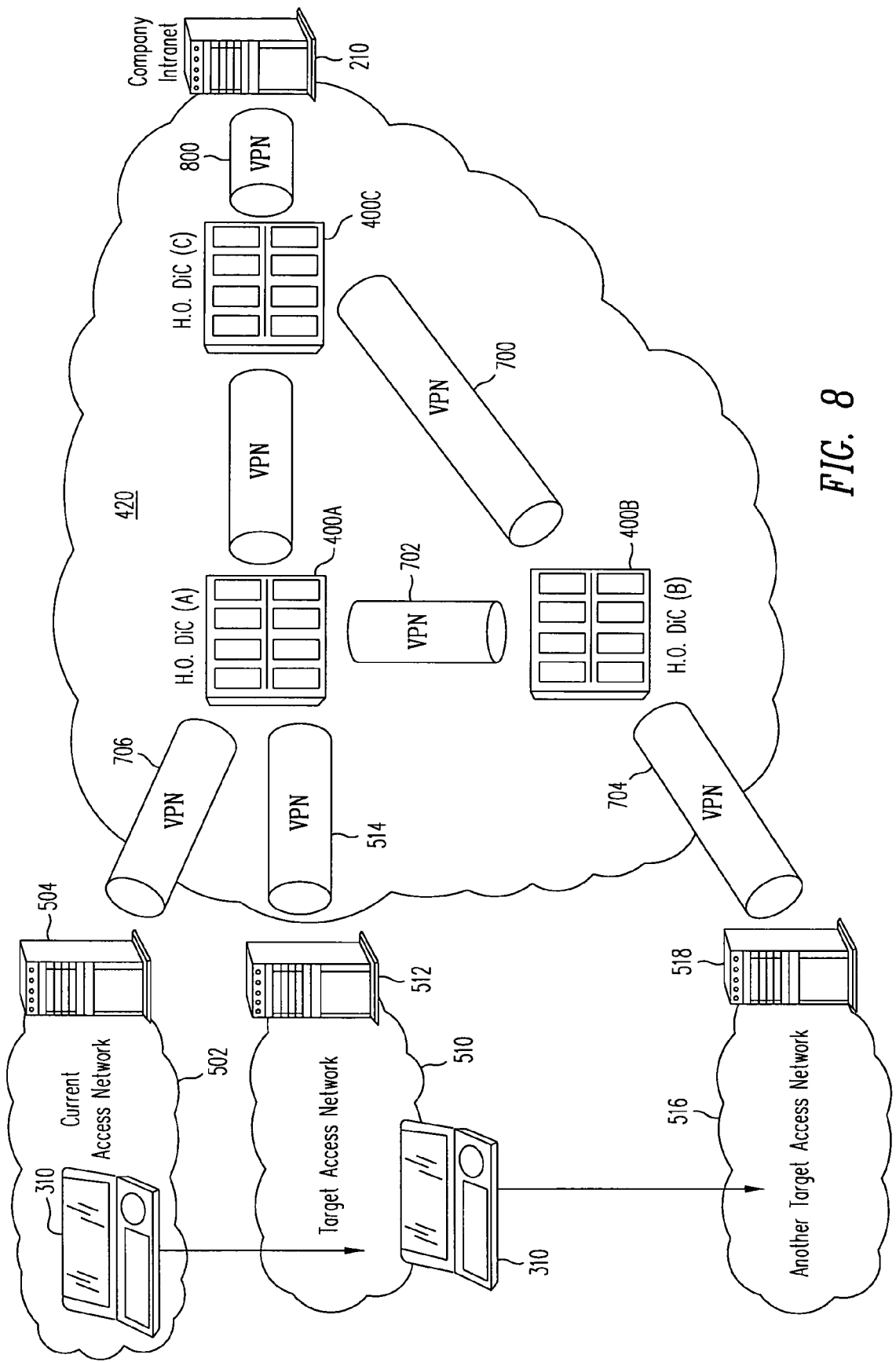
FIG. 8 schematically shows a fifth embodiment of a network architecture according to the present invention.

As an alternative to the scheme of FIG. 7, the VPN 700 can be segmented into several parts as shown by the scheme of FIG. 8. In this embodiment, a third H.O.DiC 400C establishes a VPN 800 with the company intranet 210. The pre-VPN 700 can be established between the H.O.DiC 400B and the H.O.DiC 400C if the lap top computer 310 is going to handoff. Once the pre-VPN 700 and VPN 800 are established a VPN is effectively established between the lap top computer 310 and the company intranet 210.

Figure 9:
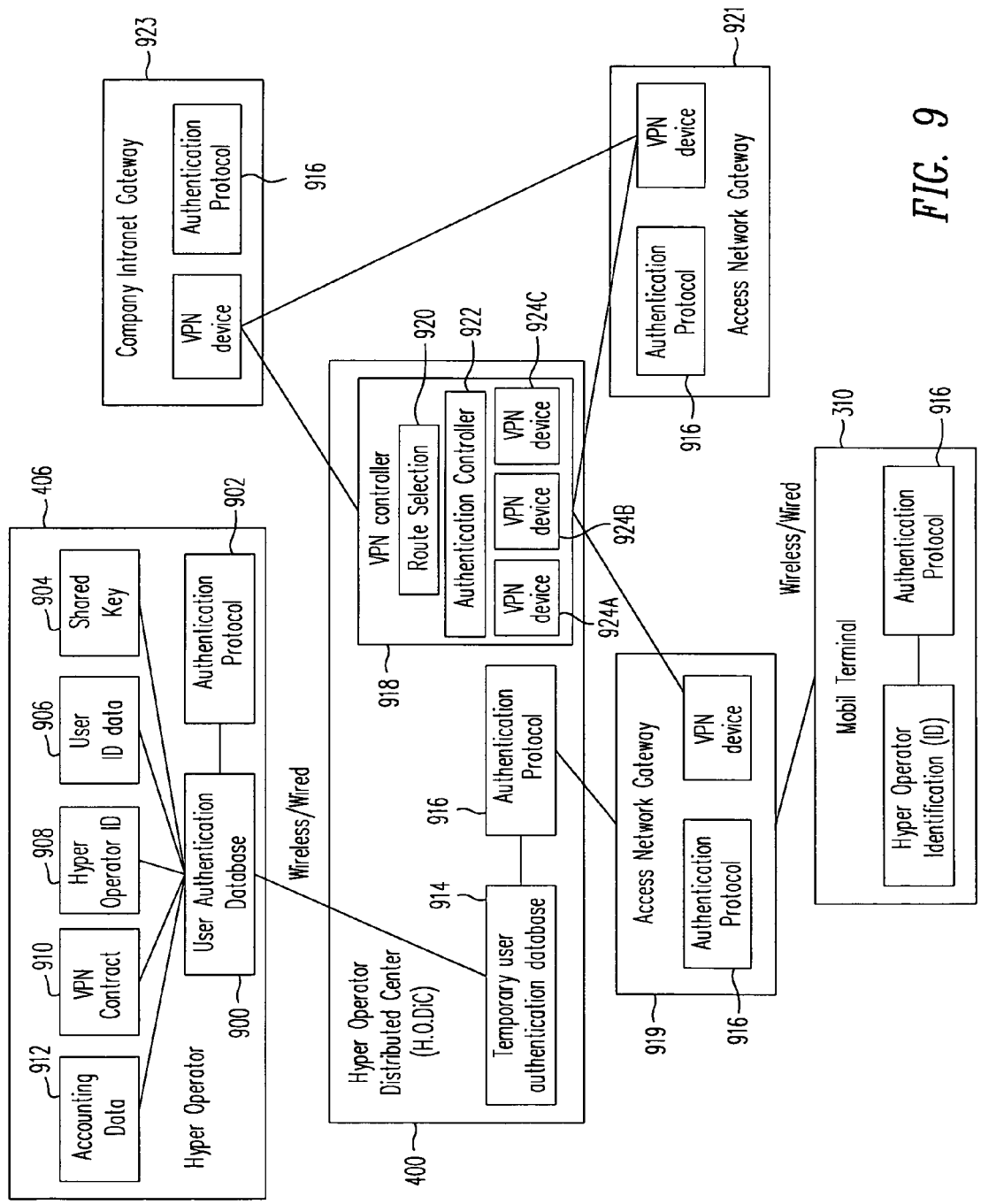
FIG. 9 schematically shows an embodiment of a system architecture for pre-authentication and pre-VPN establishment according to the present invention.

In order to fully understand the pre-VPN and pre-authentication schemes shown in FIGS. 7 and 8, various components are shown as separate entities in FIG. 9. A review of FIG. 9 reveals that the hyper operator 406 includes a user authentication database 900 and an authentication protocol 902 that handles the user and the mobile terminal authentication. The user authentication database 900 is connected to the shared key creator 904 for VPN, user ID data 906 (which includes user name, password, MAC ID, NAI (network access identifier)(See B. Aboba and M. Beadles, "The Network Access Identifier," IETF RFC 2486, http://www.ietf.org/rfc/rfc2486.txt), ITU-T X.509, and generic type), hyper operator ID 908, which hyper operator 406 stores in the ROM of the mobile terminal, VPN contract database 910 and accounting data 912 for hyper operator customer.

The H.O.DiC 400 includes temporary user authentication data 914, authentication protocol 916, and VPN controller 918. When the lap top computer 310 accesses the access network, then the access network gateway 919 will contact the H.O.DiC 400 to authenticate the lap top computer 310 based on the user authentication database 900. Since the H.O.DiC 400 is just a distributed center, it does not have user data for the lap top computer 310. Therefore, the H.O.DiC 400 corrects the user's authentication information received from the hyper operator 406. It seems that the hyper operator 406 works as a home location register and the H.O.DiC 400 works as a visiting location register/roaming operator in the mobile communication system. The authentication protocol 916 at the H.O.DiC 400 prepares different types of authentication protocol, for example, CHAP or PAP. In addition, the authentication protocol 916 at the H.O.DiC 400 authenticates the lap top computer 310 by a CHAP authentication protocol based on the hyper operator ID 908. Thus, the H.O.DiC 400 authenticates the lap top computer 310 as well as the user, where the lap top computer 310 may require the user to input a PIN code for usage authorization. Then, the authentication result will be sent to the access network gateway 919.

In order to establish VPN, the H.O.DiC 400 has a VPN controller 918, which includes route selection 920, authentication controller 922, and VPN devices 924. The H.O.DiC 400 prepares different types of VPN devices 924, such as MPLS (multiprotocol label switching) as described in the reference E. Rosen, A. Viswanathan, and R Callon, "Multiprotocol label switching architecture," IETF RFC 3031, January 2001, OBN(open business network), L2TP(layer 2 tunneling protocol) as described in the reference J. Lau et al., "Layer two tunneling protocol L2TP,"draft-ietf-12tpext-12tp-base-01.txt, IPsec (IP security protocol) and GMN-CL (global megamedia network-connection less). Because of the presence of different VPN devices 924, different types of VPN can be established between different segments. As shown in FIG. 9, the company intranet gateway 923 and the access network gateways 919, 921 can only support one type of VPN scheme. The H.O.DiC 400 can differentiate VPN because the H.O.DiC 400 can support different types of VPN devices 924A–C. The authentication controller 922 prepares pre-authentication and a shared key, which will be given to both VPN entities (i.e., the company intranet gateway and the access network gateway). Route selection 920 selects the type of VPN device 924 based on the user's requirement in terms of QoS and price. In addition, the authentication controller 922 arranges the pre-authentication and pre-VPN establishment for the possible access networks after the optimal path between the target access network and the company intranet 210 is decided by the route selection. First, the authentication controller 922 communicates to the access network gateway what type of authentication protocol is used and what type of ID is used. Based on the access network gateway requirement, the H.O.DiC 400 prepares the pre-authentication information to give the access network gateway 919 instead of disclosing the user's information. As for the pre-VPN, a VPN is established between the H.O.DiC 400 and the access network gateway based on the authentication approval.

Figure 10:
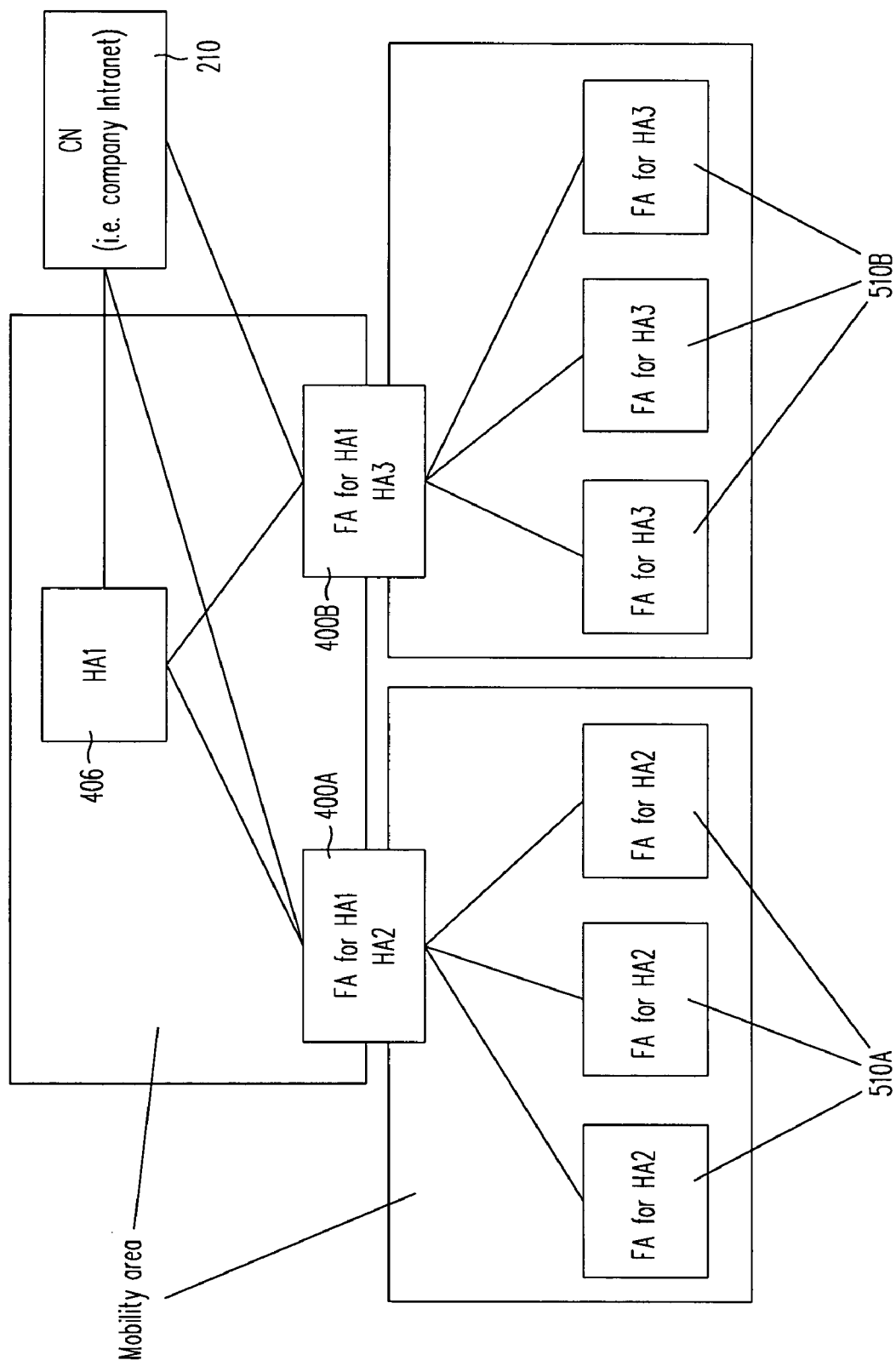
FIG. 10 schematically shows an embodiment of a hierarchical mobile IP structure according to the present invention.

FIG. 10 shows an embodiment of a hierarchical mobile IP structure, similar to that described in reference H. Soliman et al., "Hierarchical MIPv6 mobility management (HMIPv6)," draft-ietf-mobileip-hmipv6-05.txt. In this model, the hyper operator 406 operates as a home agent1 (HA1). The H.O.DiC 400 operates as a foreign agent for the HA1. In the hierarchical model, the H.O.DiC 400 becomes the home agent (HA2, HA3), then each access network gateway becomes the foreign agent for the corresponding H.O.DiC 400. Although the end-end VPN (i.e. IPsec) between the company intranet 210 and the lap top computer 310 is handled by the mobile IP, the actual packet will go through the H.O.DiCs 400A or 400B as shown in FIG. 10. The H.O.DiCs 400A and 400B are connected to corresponding target access networks 510A, 510B, respectively. Eventually, IPsec (end-to-end VPN) will go through the same transmission path as the VPN. Therefore, the end-to-end VPN can be used on the top of the proposed VPN.

The foregoing description is provided to illustrate the invention, and is not to be construed as a limitation. Numerous additions, substitutions and other changes can be made to the invention without departing from its scope as set forth in the appended claims.

We claim:

1. A network access system serving a mobile device accessing a wide area network from a plurality of access networks, the network access system comprising a network service proxy server which (1) when requested by the mobile device attached to a first one of the access networks, provisioning a first VPN tunnel between a gateway of a private network and a gateway of that first one of the access networks, the first VPN tunnel comprising a first segment between the network service proxy server and the gateway of that first one of the access networks, and a second segment between the network service proxy server and the gateway of the private network, and (2) when the mobile device moves from that first one of the access networks to a second one of the access networks, provisioning a second VPN tunnel between the gateway of the private network and a gateway of that second one of the access networks, the second VPN tunnel comprising a first segment between the network service proxy server and the gateway of that second one of the access networks and a second segment which is the second segment of the first VPN tunnel.

2. A network access system as in claim 1, wherein the access networks form heterogeneous access networks.

3. A network access system as in claim 1, wherein the network service proxy server provisions the first VPN tunnel by providing VPN security information to the gateway of the private network and the gateway of the first one of the access networks.

4. A network access system as in claim 1, wherein the network service proxy server pre-authenticates the mobile device with that second one of the access networks.

5. A network access system as in claim 1, wherein the network service proxy server pre-establishes the second VPN tunnel with that second one of the access networks.

6. A network access system as in claim 1, wherein the first segment of the first VPN tunnel and the first segment of the second VPN tunnel use different VPN tunneling protocols at the link layer.

7. A network access system as in claim 1 wherein the second VPN tunnel comprises a first segment between a second network service proxy server and the gateway of that first one of the access networks, and a second segment between the second network service proxy server and the gateway of the private network.

8. A network access system as in claim 1 wherein the second VPN tunnel comprises a first segment between a second network service proxy server and the gateway of that first one of the access networks, a second segment between the second network service proxy server and the first proxy server, and a third segment which is the second segment of the first VPN tunnel.

9. In a network access system serving a mobile device accessing a wide area network from a plurality of access networks, a method comprising:

providing a network service proxy server;

when requested by the mobile device attached to a first one of the access networks, the network service proxy server provisioning a first VPN tunnel between a gateway of a private network and a gateway of that first one of the access networks, the first VPN tunnel comprising a first seament between the network service proxy server and the gateway of that first one of the access networks, and a second segment between the network service proxy server and the gateway of the private network; and when the mobile device moves from that first one of the access networks to a second one of the access networks, the network service proxy server provisioning a second VPN tunnel between the gateway of the private network and a gateway of that second one of the access networks, the second VPN tunnel comprising a first segment between the network service proxy server and the gateway of that second one of the access networks and a second segment which is the second segment of the first VPN tunnel.

10. A method as in claim 9, wherein the access networks form heterogeneous access networks.

11. A method as in claim 9, wherein the network service proxy server provisions the first VPN tunnel by providing VPN security information to the gateway of the private network and the gateway of the first one of the access networks.

12. A method as in claim 9, wherein the network service proxy server pre-authenticating the mobile device with that second one of the access networks prior to the mobile device attaching to that second one of the access networks.

13. A method as in claim 9, wherein the network service proxy server pre-establishes the second VPN tunnel with that second one of the access networks prior to the mobile device attaching to that second one of the access networks.

14. A method as in claim 9, wherein the first segment of the first VPN tunnel and the first segment of the second VPN tunnel use different VPN tunneling protocols at the link layer.

15. A method as in claim 9, wherein the second VPN tunnel comprises a first segment between a second network service proxy server and the gateway of that first one of the access networks, and a second segment between the second network service proxy server and the gateway of the private network.

16. A method as in claim 9, wherein the second VPN tunnel comprises a first segment between a second proxy server and the gateway of that first one of the access networks, a second segment between the second network service proxy server and the first proxy server, and a third segment which is the second segment of the first VPN tunnel.

* * * * *